United States Patent [19]

Green

[11] 4,346,377

[45] Aug. 24, 1982

[54] METHOD AND APPARATUS FOR ENCODING AND GENERATING CHARACTERS IN A DISPLAY

[75] Inventor: James A. Green, Wichita, Kans.

[73] Assignee: Eltra Corporation, Morristown, N.J.

[21] Appl. No.: 155,021

[22] Filed: May 30, 1980

[51] Int. Cl.[3] .................................... G06F 3/14

[52] U.S. Cl. .................................... 340/731; 340/723; 340/789

[58] Field of Search ............... 340/700, 704, 713, 718, 340/720, 723, 731, 734, 735, 736, 739, 741, 789

[56] References Cited

U.S. PATENT DOCUMENTS

| | | | |
|---|---|---|---|
| 3,573,786 | 4/1971 | Schira | 340/731 |
| 3,614,767 | 10/1971 | Carrell | 340/735 |
| 3,911,420 | 10/1975 | Lampson | 340/731 |
| 3,991,868 | 11/1976 | Robinson et al. | 340/731 |

OTHER PUBLICATIONS

Evangelisti and Rittenhouse; Graphic Device for Drawing Shapes; IBM Technical Disclosure; vol. 13, No. 2; Jul. 1970; pp. 550, 551, 552.

*Primary Examiner*—Alvin H. Waring

*Attorney, Agent, or Firm*—Joel I. Rosenblatt

[57] ABSTRACT

A method and apparatus for displaying reduced and expanded size characters in a photocomposition device encodes each of a set of normalized characters in a series of overlapping strokes each stroke being encoded by start point coordinates and a first and second dimension of said shape, encodes a set of instructions describing the display placement and size of the characters, determines the display locations coextensive with each stroke and storing the locations, and accesses the stored locations for display of the strokes and the characters.

14 Claims, 8 Drawing Figures

METHOD AND APPARATUS FOR ENCODING AND GENERATING CHARACTERS IN A DISPLAY

RELATED APPLICATIONS

This invention is related to imaging devices as shown in U.S. Pat. Nos. 4,199,815, 4,231,096 and U.S. application Ser. No. 097,276, filed Nov. 26, 1979 and all assigned to the common assignee.

FIELD OF THE INVENTION

This invention relates to display devices such as interactive terminals which must display a page layout substantially as it will be printed with the characters in the position and size they will occupy in the printed page.

BACKGROUND OF THE INVENTION

Interactive displays most commonly use soft display means such as CRT's which provide an erasable image and which offer a facility for page composition manipulation so the image may be altered and evaluated prior to making the final printed copy. The image should substantially show the page text and graphics as it will appear in the final copy. The printed matter comprises the characters, the positions of the characters on the page, and any other printed matter which may be placed on the page layout.

In providing an interactive display, the character form size, and placement must be variable.

One of the difficulties and problems facing designers of interactive displays, was the need for a charactr data base which provide a normalized set of characters for enlargement and reduction and which could be rapidly accessed making the screen maximumly responsive to any changes. As the operator composes changes in the display, in an attempt to refine the display, the changes must be reflected rapidly on the screen to save composer time and reduce the composing cost.

SUMMARY OF THE INVENTION

A method and apparatus are provided for storing normalized encoded characters used in an interactive display terminal and whose encoding form permits rapid access and manipulation of that data base into the size characters desired for display.

The normalized characters are encoded by providing a series of strokes, each stroke being a geometric shape which forms a composite when taken together to define a character. These geometric shapes shown in the preferred embodiment are rectangles. However, any other shape which can be defined in data according to the principles of the invention may be used, and these shapes may be encoded one relative to the other to define a multiplicity of character designs. In the preferred embodiment, the characters are encoded by a series of strokes or rectangles which are overlapped to form the composite character.

The overlapping is at a minimum of one or two display pixels when imaged on the display to insure that any change in dimensioning of the character from its normalized data base does not cause a separation of the components and a gap between the components which would disturb the continuity of the character.

The principal reason for stroke overlap is to avoid a quantization error problem which arises when scaling images initially referenced to discretely describe background space such as a grid and which has a graininess. To avoid distortions in two adjacent scaled strokes, adjacent strokes are overlapped. Additionally, in scaling at least a square's multiplication is used so the multiplication performs rounding instead of truncating.

As will be seen in the preferred embodiment, the characters can take any desired form by changing the placement and dimensions of each of the strokes.

The characters are encoded in data by producing a first data value corresponding to the width of the character block or em square enclosing the character. A second value is added denoting the number of strokes used to describe the character.

Each of the strokes may be a particular geometric figure coded by a start point referenced to a location in the character's block and the height and width of each stroke, as where the strokes are rectangles.

The character data is then scaled to transform the normalized character data into scaled data for the desired display size.

To increase data access, a series of tables are used which give the new scaled character data corresponding to the scaler inserted by the composer. The scaled data, is then used according to the described method and the resulting data is mapped into a raster bit memory at the designated locations.

As in a conventional bit map memory, a series of data bits are provided at the memory locations where the CRT beam is to be either unblanked or blanked and which will then define the character imaged on the display. One such bit memory which can be used is a 4116 made by Motorola.

Although the bit map memory is used in the preferred embodiment, the invention should not be thought of as limited to that memory as other suitable memory devices may be used.

Data for single raster lines intersecting a stroke in a first dimension is placed into the corresponding raster memory location and then the same data is placed into additional raster memory locations corresponding to the intersection of the other raster lines and the stroke in a second dimension.

The bit map raster memory may be a word boundary memory as shown in the preferred embodiment where each raster line is a multiple of N memory words, and a position on any one line is denoted by a number of data words M less than N.

The bit map address pointer as is well-known in the art would then be incremented in synchronism with movement of the CRT beam from display pixel to pixel and with the data at the address pointer location accessed in correspondence to the beam location.

To increase speed of the device, data bits comprising display data for a portion of a raster line, is taken from the memory in multiple words and bytes and then shifted out of a register bit by bit in synchronism with the movement of the beam over each pixel.

Where a displayed stroke starts in the middle of a memory word and/or the stroke data extends over a word boundary, a mask is provided with a number of bits corresponding to the extent of the stroke in one dimension and on one side of that boundary. This mask is then loaded into a register and is shifted an amount equal to the offset of the start of the stroke from the word boundary so the data bits in the memory coincides with the exact location of the displayed raster line.

Where the data for the character extends on the other side of the word boundary, a suitable mask having a number of bits corresponding to the extent of that stroke is placed into the memory at that corresponding location.

Where the width of a word intersecting a raster line extends more than one word boundary, then a mask being a number of full data words is added to the memory. Any partially filled word is then completed as described above.

Accordingly a method is shown for displaying reduced and expanded normalized characters in a photocomposition device by decoding each of the set of normalized characters in a series of overlapping strokes with each stroke being encoded by start point coordinantes by a first and second dimension of each said stroke, by encoding a set of instructions describing the display placement and size of said characters, and by determining the display locations coextensive with each said stroke and storing said locations and then by accessing said stored locations to display the strokes and the characters.

Further shown is an apparatus for displaying reduced and expanded normalized characters in a photocomposition device by providing means for encoding the set of normalized characters in a series of overlapping strokes defined by the start point of each stroke relative to the character block and by a first and second dimension of each stroke, by means for encoding a set of instructions describing the display placement and size of the characters, by means for determining the display locations coextensive with the strokes and storing said locations and by means for accessing said stored locations for display of said strokes in said characters.

DESCRIPTION OF THE PREFERRED EMBODIMENT

Figure 1:
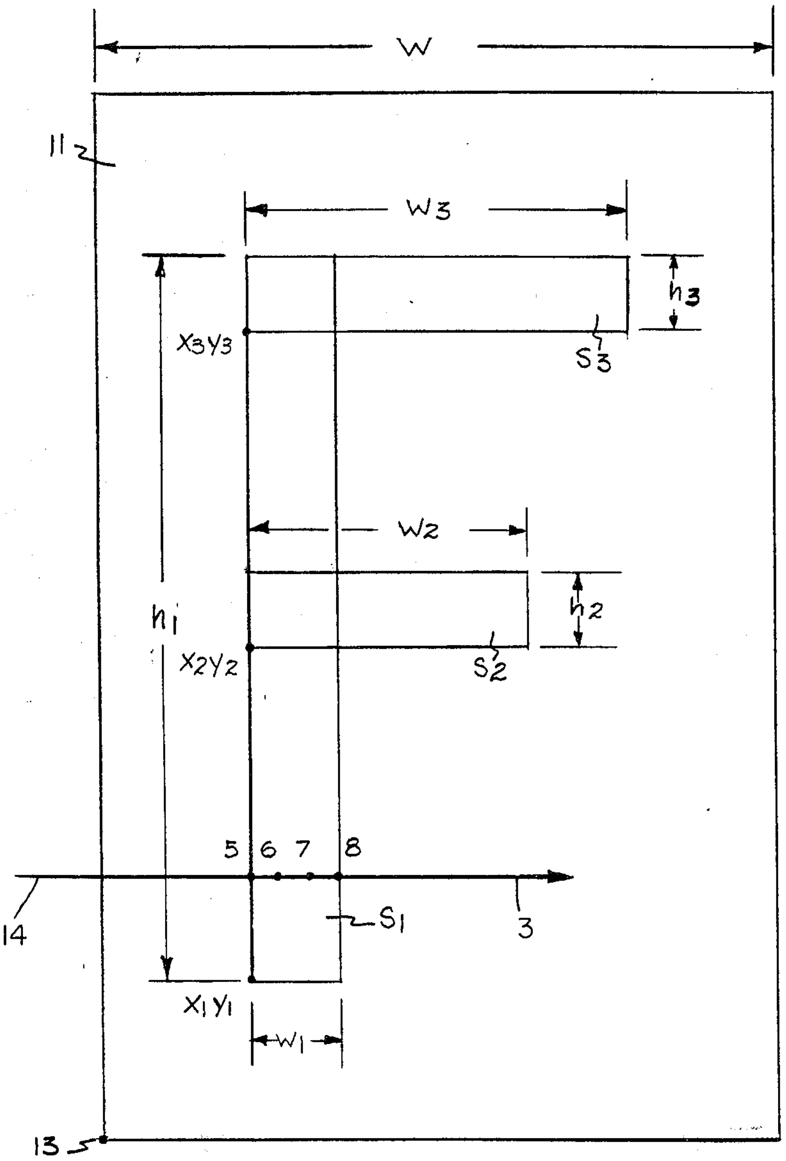
FIG. 1 shows a representative character encoded according to the principles of the invention.

FIG. 1 shows a representative character "F" within a character block 11 such as an em square having a width W and with the character formed of strokes shown as geometric shapes S1, S2 and S3. Each one of the strokes S1 through S3 has a start point, X1 Y1; X2 Y2; X3 Y3, displaced from a reference location 13 in the em square shown as the lower left hand corner. Each of the strokes S1 through S3 is described by a width wn and a height $h_n$. As shown stroke S1 has a width wn and height $h_1$. The strokes each S1 through S3 overlap with at least one other stroke. As shown, S2 overlaps with S1 and S3 overlaps S1. The character is encoded in dimensionless data resolution units.

Figure 2:
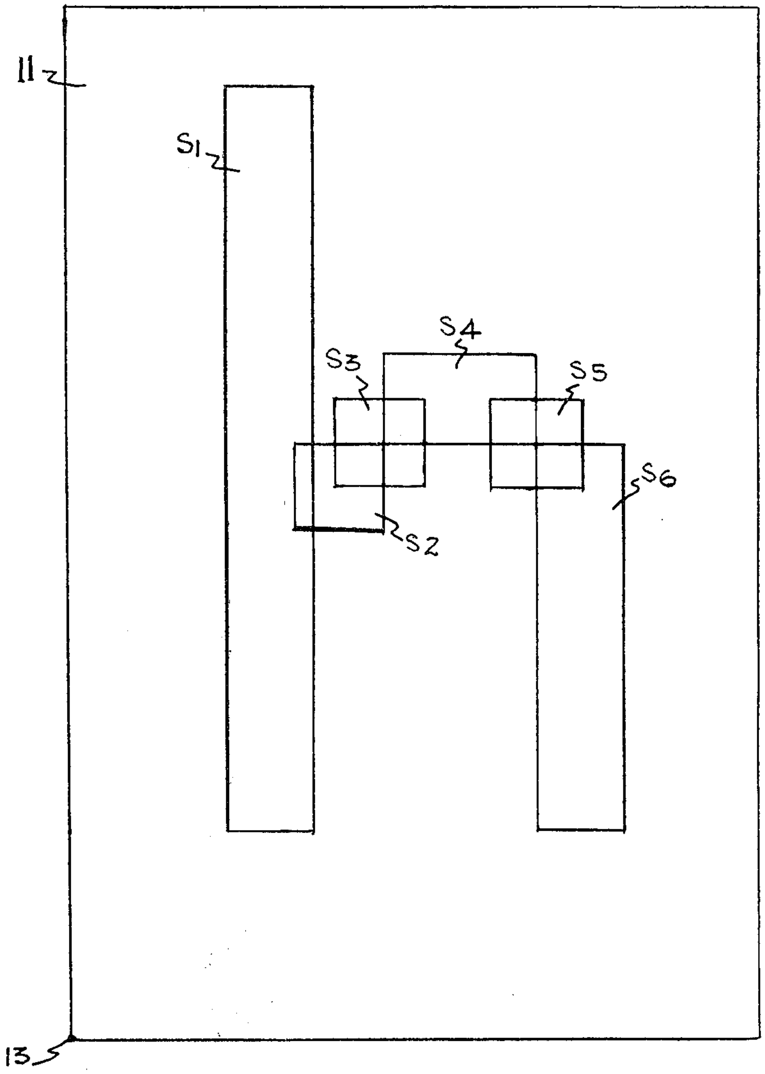
FIG. 2 shows another representative character and the encoding of curved character sections.

The character strokes may be the geometric shapes shown as rectangles combined in substantially straight or curved sections, as shown in FIG. 2. Where the character block 11 is shown containing an "h" composed of sections S1, S2, S3, S4, S5, S6 and S7. As can be seen, the curved section is described by the overlapped and connected shapes S2 through S6. As can be seen, the shape can be refined yielding a more continuously curved section by increasing the resolution of the encoded data.

Figure 3:
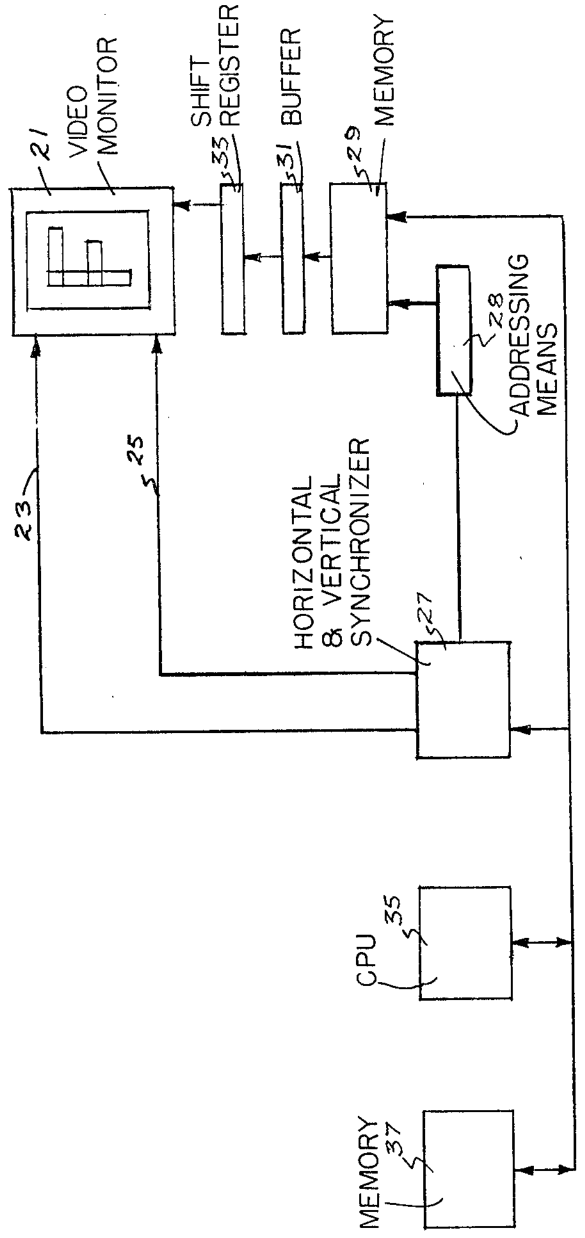
FIG. 3 shows a system for carrying out the display of characters from the encoded information.

A system for carrying out the invention is as shown in FIG. 3. In FIG. 3, a video monitor shown as 21 connected to a source of horizontal sync signals on line 23 and a source of vertical sync signals on line 25 derived from a synchronizing means shown as 27. The synchronizing means is also connected to the memory 29 through addressing means 28 and drives the memory means to access selected memory locations in memory 29 in synchronization with the video beam movement and to provide that data to the video display through buffer 31, and shift register 33.

A Central Processing Unit (CPU) 35 is connected to the synchronizing means 27 and to the memory means 29 through a bus 38 and controls the transfer and loading of character data into the memory 21 as will be explained. The buffer 31 may be a stack of registers serving as a First in First Out (Fifo) buffer to increase the transfer speed of the data from the memory to the monitor.

A second memory 37 is shown connected through to the CPU 35 through bus 38, and which may serve as a store for the font data shown in FIG. 1 and FIG. 2.

The memory means 29 is a bit map memory, which corresponds to the display area in the monitor 21 and with memory locations corresponding to the pixels in the display.

The bit map memory is addressed in data bytes and data words are accessed from a memory and placed into the buffer 31. However, the invention may be practiced with any other known and suitable memory and addressed in any other suitable manner.

The memory is organized into words with a predetermined number of words corresponding to a single raster line. Then N words may comprise a memory section coextensive with part of the display such as a raster line. Each multiple K of N words may then indicate the start of a particular raster line. The number of M words ($M<N$) following each KN line (K is an integer) would indicate a location on a line along a first dimension. For example, the zero memory locations through N-1 memory location would correspond to the first line of a raster line display. The Nth memory word ($K=1$) would correspond to the first word of the second raster line and start that portion of the memory corresponding to the second raster line and extending through the N-1 word. The 3N ($K=3$)+2nd word ($M=2$) would be the third word on the fourth raster line where each word may comprise 16 data locations, each data location corresponding to a pixel and the $3n+2$ word would contain the data bits for data bits 32 to 63 and for pixels 32 to 63 on raster line 3.

In this way, and as is well-known in the art, as the beam was swept through each raster line and then stepped to each successive raster line, the address means 28 responsive to the video synchronizing signals is incremented to access the data in the respective data locations corresponding to the location of the beam.

Indexing the address pointer 28, by KN words, moves that pointer data address to a memory location in a second direction either upwards or downwards one raster line depending upon the direction of indexing.

Indexing the address pointer 28 MN words would address a different memory location displaced less than one full raster line in a first direction.

As is the case in bit map memories, a one bit may be placed in memory for those locations where the CRT beam is turned on as where a raster line intersects a character, and extends through a character. For a raster line portion coextensive with a character stroke, as shown for line 14 in FIG. 1 a series of one bits would be placed in the memory turning that beam on at the start of the character stroke and turning if off when the raster line has reached the end of that character stroke.

As shown in FIG. 1, for raster line 14 proceeding in the direction of the arrow 3, a series of data bits would be put into the memory means starting at memory location 5, 9, and continuing through memory location 6, 7, and 8.

Movement of the beam, would simultaneously cause the sync signals to increment memory address pointer 28, to access the memory contents at location 5, turning the beam on at points 5, 6, 7 and 8 and turning it off at subsequent locations.

Figure 4:
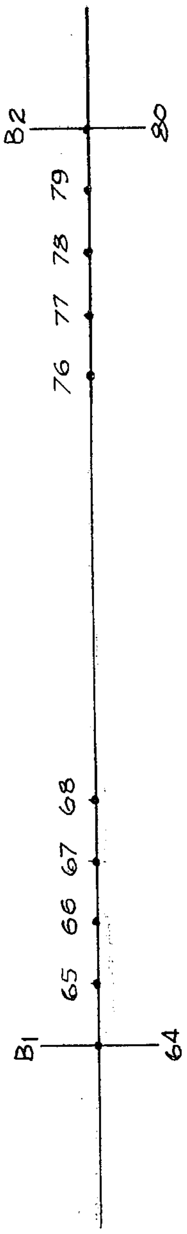
FIG. 4 shows the manner in which a bit map memory may be organized into words.

The memory itself is organized into words, each word as shown in the preferred embodiment contains 16 bits or two bytes each. As shown in FIG. 4, memory boundaries B1-B2 are placed at 16 bit intervals and each pair of boundaries defines a memory word of 16 bits. As shown for example, memory locations 64 through 79 are defined by memory boundaries shown as B1 and B2 in this representation. The memory locations within the boundary B1, B2 contains bits 64 through 79, partially shown. An addressing scheme which may be used then is accomplished by specifying word addresses in pairs or byte addresses and transferring 32 bits at one time from the memory, to Fifo buffer 31 and to shift register 33. The data is then shifted out bit by bit as the beam is incremented from pixel to pixel. The data access can be by conventional DMA techniques.

In mapping the character data into the bit memory, the character font data is scaled to the desired size.

Font character data may be comprised by a table T of character data for the strokes forming the character.

$$T = \begin{cases} \text{W, J} \\ s_1 = x_1, y_1, w_1, h_1 \\ s_2 = x_2, y_2, w_2, h_2 \\ s_3 = x_3, y_3, w_3, h_3 \\ \cdot \quad \cdot \quad \cdot \quad \cdot \quad \cdot \\ \cdot \quad \cdot \quad \cdot \quad \cdot \quad \cdot \\ s_n = x_n, y_n, w_n, h_n \end{cases}$$

where:

W is the width of the character block in data resolution units.

J is the number of strokes (S1, S2, S3, Sn).

$x_n$, $y_n$ is the start point for each stroke referenced to a point in the character block and given in first and second directions.

$h_n$ is a second dimension as the height of each stroke, and $w_n$ is a first dimension shown as the width of each stroke.

The stroke data expressed in dimensionless data resolution units may be used directly for a character of a predetermined size such as 50 pt. or may be scaled by a factor and to display an enlarged or reduced character.

$$\alpha T = \begin{cases} \alpha \text{W, J} \\ \alpha s_1 = \alpha x_1, \alpha y_1, \alpha w_1, \alpha h_1 \\ \alpha s_2 = \alpha x_2, \alpha y_2, \alpha w_2, \alpha h_2 \\ \alpha s_3 = \alpha x_3, \alpha y_c, \alpha w_3, \alpha h_3 \\ \cdot \quad \cdot \quad \cdot \quad \cdot \quad \cdot \\ \cdot \quad \cdot \quad \cdot \quad \cdot \quad \cdot \\ \alpha s_n = \alpha x_n, \alpha y_n, \alpha w_n, \alpha h_n \end{cases}$$

and the scaled stroke data for the "F" of FIG. 1 is shown as $$\alpha T_f = \begin{cases} \alpha W_n, \\ \alpha s_1 = \alpha x_1, \alpha y_1, \alpha w_1, \alpha h_1 \\ \alpha s_2 = \alpha x_2, \alpha y_2, \alpha w_2, \alpha h_2 \\ \alpha s_3 = \alpha x_3, \alpha y_3, \alpha w_3, \alpha h_3 \end{cases}$$

The scaled table of stroke font data now contains the scaled start points, height (h) and width (w) data necessary to arrange the data in the bit memory display memory corresponding to the size character desired.

Figure 5:
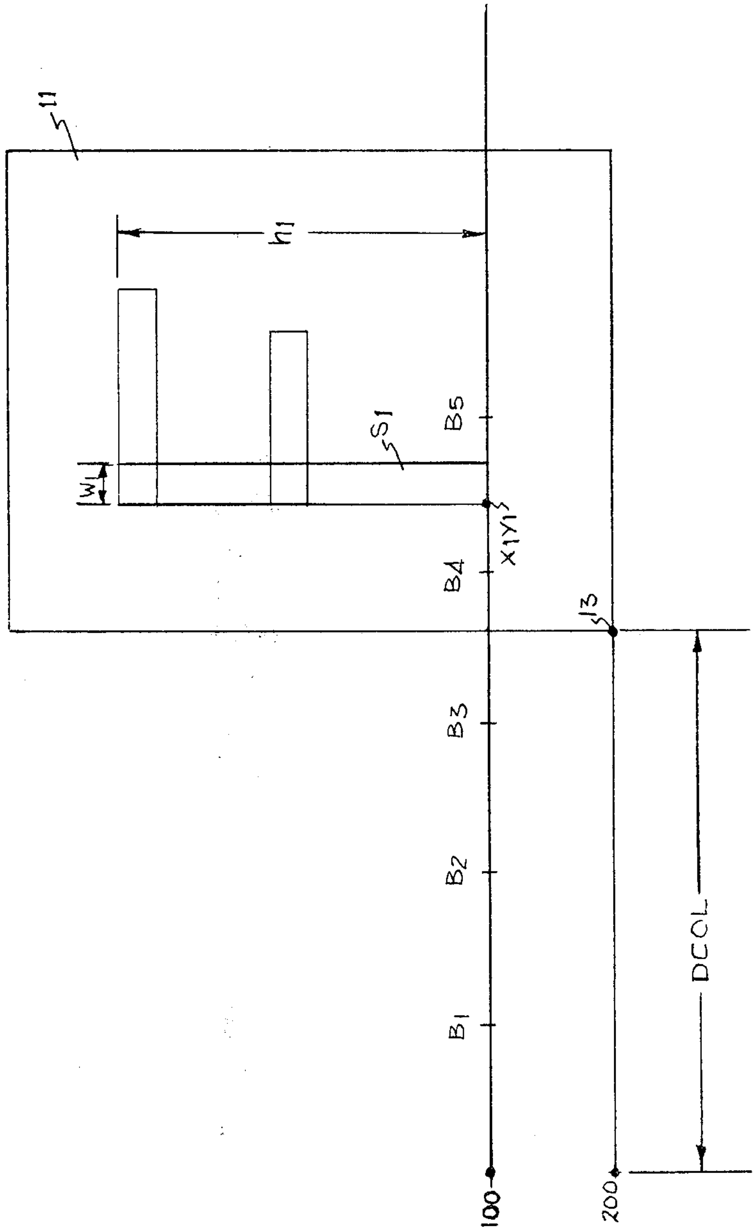
FIGS. 5 and 5*a* show the encoding of the character of FIG. 1 superposed on a bit map memory.
Figure 5A:
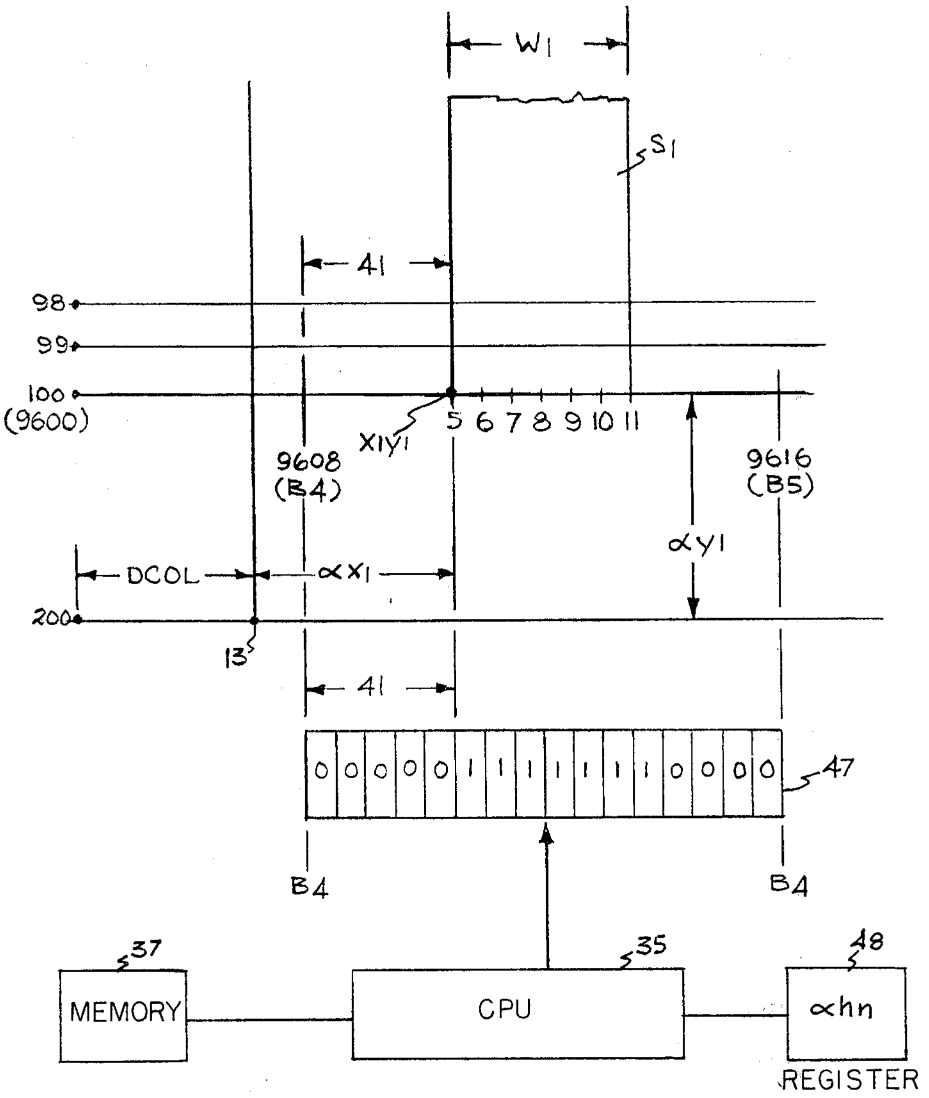

FIG. 5 and FIG. 5A shows the character "F" imaged on a series of raster lines and superimposed on the bit map memory, containing that series of data for the raster lines. FIG. 5A is an expanded view of a part of FIG. 5 showing greater detail.

A series of display raster lines 1 through 200 is shown.

The raster display being understood to have a greater number of raster lines not shown.

Raster line 100 intersects stroke $S_1$, forming part of the composite F. Raster line 100 is shown superposed on the bit map memory divided into 16 bit words shown by the hash marks B1-B5.

It should be understood however, that the principles may be practiced with any suitable display memory. The bit map is used in the preferred embodiment and is shown as the best mode of carrying out the invention.

The bit map memory simulating a raster display may be divided into 768,000 separate data locations representing 48-16 bit words per line, and with each of the 16 bits in a word representing one data bit and one display pixel. The memory may be addressed in bytes of 8 bits each representing 96 separate addressable memory increments or bytes per raster line.

Starting with the zero word for the first line, the second line would be start with byte 96, (N=96, K=1) the third line with byte 192 (N=96, K=2) and with the start of each line having an address of KN bytes or K 96 bytes in the bit memory.

As the beam sweeps through each raster line and then progresses to another raster line, as stated above, the address counter responsive to the synchronizing signal is indexed accessing the address locations in the memory and using the values placed in memory to control the display.

As shown in FIG. 5A, stroke S1 intersects raster line 100 within the fourth ($B_4$) 16 bit word for that line. The stroke starts an additional five pixels or from byte address 9608 (corresponding to word $B_4$) and the width of the stroke S1 extends from bit 5 through the 11th data bit of byte 9608.

CPU 27 scales the stroke data and loads that stroke data into the bit map memory 29.

In typography, each character is set into a character block shown as 11 in FIG. 1 and in FIG. 5. The composer specifies the placement of the character block on a line shown as point in a line indented from the line start and which is described here by the term DCOL. The DCOL line value is combined with the stroke $x_n$ displacement in the first direction as scaled representing the first intersection of the stroke S1 with raster line 100. Line location DCOL is added to $\alpha x_n$ the displacement in a first direction from block reference 13 to the start point of $S_1$ and that quantity is divided by 16 to determine the line location word address for the start $\alpha x_n$, $\alpha y_n$ of stroke $s_1$. The full line address is determined first by obtaining the partial line address.

$$\text{PARTIAL LINE ADDRESS} = \frac{\text{DCOL} + \text{Xn}}{\text{P}} = Q + R$$

where

DCOL is the horizontal displacement from the raster line start, $x_n$ is the scaled horizontal displacement for the stroke $s_1$ from the character block reference 13, P is the number of data bits within a memory boundary, Q is the full word location for the address and R is a remainder less than Q and a starting location of the stroke within a memory word. R is removed, saved and not included in the partial line address.

The remainder R is used later to place bit values within a memory word boundary corresponding to a first dimension of stroke $s_1$.

The scaled stroke value start point ($\alpha y_n$) in a second direction is then used to determine the full line address where the full line address = line address + Partial line address, and where K is the line number, N is the number of words in a line and the line address is K·N, and $\alpha y_n$ is the scaled displacement of the stroke $s_1$ from the character block reference 13.

The full line address is expressed as

FULL LINE ADDRESS =

$$\text{Line } K \cdot N \frac{\text{lines}}{\text{byte}} = \left(\alpha y_n \cdot N \frac{\text{bytes}}{\text{line}}\right) + Q \text{ bytes}$$

The determination of the full line address is shown by way of example below.

For FIGS. 5 and 5a.

DCOL = 58 units (58th pixel on line 100)

$\alpha x_1 = 11$ units

P = 16 bits/memory word

R = 2 bytes/memory word $$\text{PARTIAL LINE ADDRESS} = \frac{58 + 11}{16} = \underset{Q}{\text{4th word}} + \underset{R}{\text{5 bits}}$$

The remainder R is saved and the partial line address given in bytes is $$Q = 8\left(4 \text{ words} \times \frac{2 \text{ bytes}}{\text{word}}\right)$$

The full line address is determined as follows where the line address for line K=200 is $$\left(200 \cdot \frac{96 \text{ bytes}}{\text{line}}\right) = 19{,}200 \text{ bytes and}$$

$$\alpha y_n = 100 \text{ lines} \cdot \frac{96 \text{ bytes}}{\text{line}} = 9600 \text{ bytes}$$

The full address = 19,200 bytes − 9600 bytes + 8 bytes = 9608 bytes.

The partial line address is the memory address for the start of the stroke S1 within the fourth word B4 on line 100. The address is then completed by adding to the partial line address, the memory address for line 100.

The character block 11 is referenced to a raster line by the composer, when initially setting text. That line location is then used with DCOL to determine the raster line location for the start point of the stroke Sn (xn, yn). The location of the scaled stroke along one direction $\alpha x_n$ is then combined with the scaled stroke location in the second direction $\alpha y_n$ to determine the full memory address.

It being understood by those skilled in the art, where each memory lie is an increment of 96 bytes, then decrementing the address by Z 96 words, will move that address location in the bit map memory lines in the second direction (y) depending upon whether the address is incremented or decremented and without changing the location of the location in the first direction (x).

The full line address then identifies the memory word and byte location containing the data bit values describing that part of a raster line at byte address 9608 (raster line 100), bits 5 to 11, coextensive with a first dimension $w_1$ of stroke $S_1$.

The placement of data into the memory is then completed so that when the data word corresponding to address 9608 is accessed. A series of 4 "0" bits followed by 7 "1" bits will be provided to the monitor causing the display to be unblanked where line 100 first intersects S1, and coextensive with the first dimension $w_1$.

To complete the insertion of data for stroke S1 in the memory, a mask is derived from a mask table, as shown below.

The mask selected will have a number of bits or bit values indictive of the raster line portion coextensive with the stoke first dimension (w). The mask table contains word values for the most significant bits (MSB), and a word value for the least significant bits (LSB) of a memory word as follows

| | MSB Mask |
|---|---|
| 80 | 1 0 0 0 0 0 0 0 |
| C0 | 1 1 0 0 0 0 0 0 |
| E0 | 1 1 1 0 0 0 0 0 |
| F0 | 1 1 1 1 0 0 0 0 |
| F8 | 1 1 1 1 1 0 0 0 |
| FC | 1 1 1 1 1 1 0 0 |
| FE | 1 1 1 1 1 1 1 0 |
| FF | 1 1 1 1 1 1 1 1 |

| | LSB Mask |
|---|---|
| 80 | 1 0 0 0 0 0 0 0 |
| C0 | 1 1 0 0 0 0 0 0 |
| E0 | 1 1 1 0 0 0 0 0 |
| F0 | 1 1 1 1 0 0 0 0 |
| F8 | 1 1 1 1 1 0 0 0 |
| FC | 1 1 1 1 1 1 0 0 |
| FE | 1 1 1 1 1 1 1 0 |

-continued

| | |
|---|---|
| FF | 11111111 |

The mask is a 16 bit word and comprises a word from the MSB Mask and LSB Mask. The mask will then have a number of data bits or values corresponding to the scaled stroke first dimension $\alpha x_n$. The mask chosen for FIG. 5*a* would then be 1111111000000000.

The mask may be loaded into a shift register 47 in FIG. 5*a*, shown coextensive with the memory word between byte 9608and 9616 to aid in explanation, and then shifted by a number of bit locations corresponding to an offset 44 or remainder R derived from the partial line address and indicative of the number of bits between a memory word boundary and the start of the stroke in the first direction (x).

The shifted mask is then loaded into memory location 9608. A separate register 48 is loaded with the scaled stroke scaled value in the second dimension.

When the mask value is loaded into the memory 29, for the first raster line having a portion intersecting or coextensive with a stroke, the counter 48 is decremented, the address pointer is indexed by a number of bytes (96) equal to one full line and the mask is loaded into the memory word address 9512 corresponding to the next immediate line 99.

This procedure is repeated for each raster line until the value of counter 48 is 0, and the memory locations for each line having a portion intersecting a stroke contain a series of bit values corresponding to the portion of each line intersecting or coextensive with the stroke first dimension $w_n$.

Figure 6:
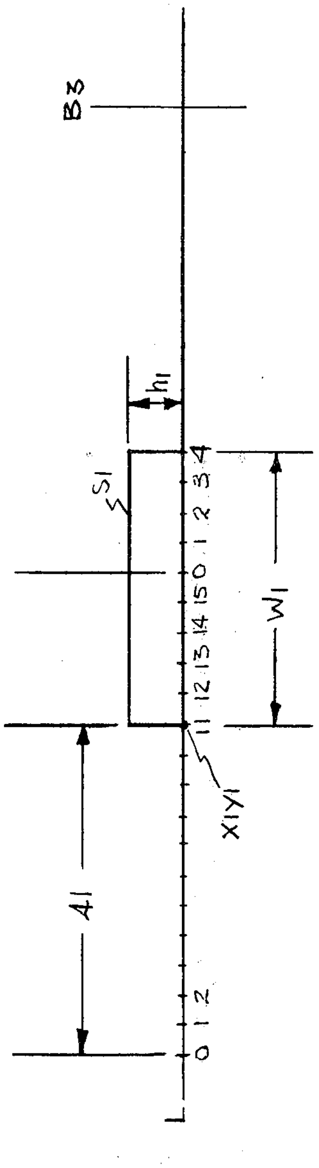
FIG. 6 shows the encoding of a portion of a character over one display line extending over a memory boundary.

A stroke width may extend across a line boundary shown in FIG. 6 by stroke S1 having a width w, extending across memory word boundary B2 and being displayed on line $L_n$ of a display containing a number of lines.

Stroke S1 is mapped onto bit locations 11 through 15 for memory word B1 and bit location 0 through 4 of word B2.

The technique shown for FIG. 5 is selecting the mask of a number of bits equal to the stroke first dimension is the same. In this case, the seven bit mask 11111110 is placed in the shift register 47 and then shifted equal to the offset shown as 41, and corresponding to the remainder R.

The mask is then loaded into each of the other raster lines intersecting stroke S1 by indexing the address pointer 28 by full line increments and register 48 is decremented accordingly from $h_n$ to 0.

The address counter is then incremented shifting to the next contiguous memory address, from B1 to B2 and a mask value for the data on the other side of the boundary is loaded into the shift register. In this mask 11110000 is loaded from into the shift register and into the memory 37, corresponding to the value for memory word B2 but without shifting as the mask extends from the beginning of the word boundary B2.

Figure 7:
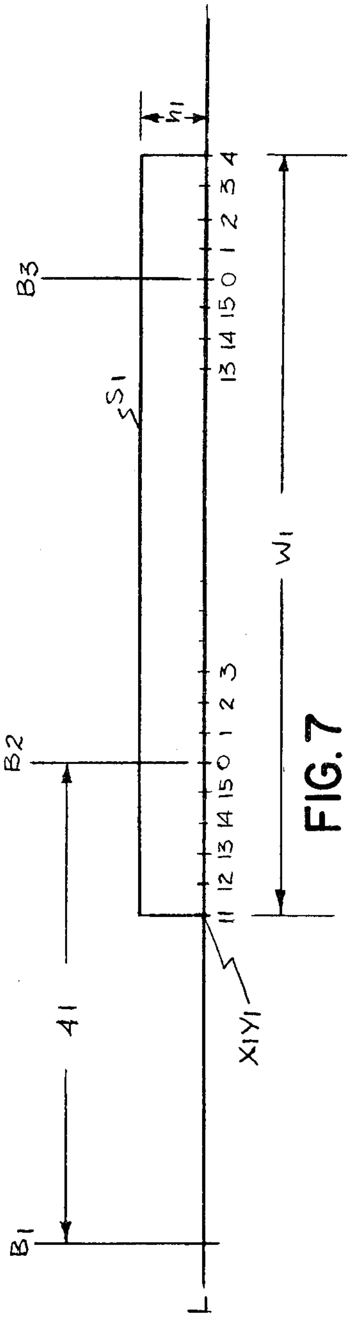
FIG. 7 shows the encoding of a portion of a character over one display line extending over two-memory boundaries and one full memory word.

It can be determined if a stroke extends beyond a memory boundary as for example in FIG. 6 and FIG. 7, by taking the offset R, and adding the scaled stroke width $\alpha x_n$ and then subtracting the number of data bits P in a word. As shown for the preferred embodiment:

Offset R+P; P=U

Where the product U is greater than 16 but less than 32, (FIG. 6), then the scaled stroke width $x_n$ extends only across one memory boundary. Where the remainder is greater than 32 and less than 48 (FIG. 7), the scaled stroke width $x_n$ extends across a complete word (B2) and so on. A mask with a number of bits equal to a full memory word P=16 bits may be set in the shift register 47 and then placed into the respective word address locations for each respective line. The procedure followed is the same as for FIG. 6. After the first mask is placed in the memory locations for memory word B1 on all respective lines, the address register would be incremented to the next word B2 in the first direction, the shift register contents with the mask value FF, is loaded into the word B2, and repeated for each raster line in the second direction. Where the stroke ends in less than a full word, the procedure above shown for FIG. 6 word B2 may be repeated for word B3.

In practice, the mask once loaded for each word, is then placed in the memory bit location for each preceding raster line by decrementing the memory address register by an amount of memory words corresponding to the displacement of one full line and decrementing counter 48 loaded with an initial value $h_n$ the stroke second dimension, until zero and the bit memory has been completely filled for the full extent of the stroke in the second dimension.

Then the remainder of the bit memory is filled by the same procedure for the balance of the stroke remaining in the first dimension $w_n$ and for additional contiguous word boundaries as shown in FIG. 6 and FIG. 7.

The apparatus which may be used in carrying out this invention may be any suitable apparatus presently known.

For example, the CPU 35 may be an Intel 8086, $w_1h_1$ compatible memory 37 for storing digital representations of the font characters.

The synchronizing means 37 may be any suitable means providing synchronizing signal to a video monitor such as a Motorola, M4408 and which may provide synchronizing signals to an address pointer to increment the memory address in step with movement of the CRT beam across each display.

The Fifo stack 31 may be a set of suitable registers and the shift register 33 may be any suitable shift register as for example a 74S195.

As shown in the scheme, the data words comprising 16 bits each or two bytes are address by memory byte locations and in the preferred embodiment are provided two words (4 bytes) at a time to the shift register 33. However, the scheme for accessing data from the memory may be varied within the principles of the invention. The memory means are shown as a bit memory which simulates the raster display and provides a memory location for each pixel in the display and with the result that each data bit is used to determine whether that pixel will be eliminated or left blank.

However, it should be understood that within the principles of the invention directed towards the manner of font encoding and display, other memories may be used which provide a means for storing the display data produced from the font data scaled for a particular size character.

Further, and according to a further principle of the invention, the method for placing data in the memory, and within divisions other than the address divisions shown may also be used with any other suitable memory divided into boundaries comprising any number of data memory elements.

In this application, that technique is shown with a memory divided into 16 bit words where each bit is the data element.

Further given the principles of the invention suitable programming compatible with the particular hardware selected may be derived by one skilled in the art and the particular programming should not be thought of as limiting of the invention.

I claim:

1. A method of displaying reduced and expanded size characters in a photocomposition device comprising the steps of:

(a) encoding each of a set of normalized characters in a series of overlapping strokes, each stroke being a geometric shape and each stroke being encoded by start point coordinates and a first and second dimension of said stroke, (b) encoding a set of instructions describing the display placement and size of said characters, (c) determining the display locations coextensive with each stroke and storing said locations, (d) accessing said stored locations for display of said strokes and said characters.

2. The method of claim 1, wherein said step (a) of encoding strokes includes the step of (e) encoding rectangular strokes, each said rectangle being defined by its start point relative to a character block reference and by a first dimension, and a second dimension.

3. The method of claim 2, where said first dimension is the stroke width and said dimension is the stroke height.

4. The method of claim 2, where said step (c) of determining the said display location includes the step of scaling each of said characters start points, and first and second dimension for display of said characters on a raster line display, (f) loading data into a memory for each raster line portion intersecting said strokes of said displayed characters, and (g) where said step (f) of loading includes the steps of loading data for a first raster line intersecting each said stroke, said data being indicative of the first dimension of said rectangle and, (h) repeating said step of loading said data for a series of raster lines, said raster line series and said first raster line forming a progression of raster lines coextensive with the second dimension of the stroke.

5. The method of claim 4, where said step (f) of loading includes the step of selecting a mask having a data value corresponding to the said stroke first dimension.

6. The method of claim 4, wherein said step (f) of loading includes the step of storing said raster line data in a word boundary memory and includes the steps of loading said data across said word boundary by the step of (i) determining where said raster data for said character crosses a memory boundary (j) determining a first offset of said raster line data within said boundary, (k) selecting a data mask having a value corresponding to said stroke first dimension and shifting said mask into said word boundary by a displacement corresponding to said offset and (l) determining the extent of said raster data on the other side of said boundary and loading a mask having a value corresponding to the extent of said raster data on the other side of said boundary.

7. The method of claim 5, where said step of loading includes loading said mask into a word boundary includes the step of determining the offset of said mask within the said boundary and shifting said mask to load said data into the display data locations.

8. The method of claim 4, wherein said step i includes the step (m) of adding the first dimension and offset value and subtracting the memory word value to determine the number of memory words comprised by said data and selecting a mask having a number of bits equal to said full memory word for each full memory word, and loading said mask into the memory.

9. The method of claim 3, wherein said step of loading includes the step of storing said raster line data in a word boundary memory and includes the steps of loading said data across said word boundary by the step of (n) determining where said raster data for said character crosses a memory boundary (o) determining a first offset of said raster line data within said boundary, (p) selecting a data mask having a value corresponding to said stroke first dimension and shifting said mask into said word boundary by a displacement corresponding to said offset and (q) determining the extent of said raster data on the other side of said boundary and selecting a mask having a value corresponding to the extent of said raster data on the other side of said boundary and loading said mask into said memory.

10. The method of claim 4, where said step (h) includes the step of loading said raster line into successive raster memory locations displaced from said first location by a number of words corresponding to the next preceding raster line.

11. A method of encoding normalized characters including the steps of describing the characters in a plurality of overlapping strokes within a character block, each of said strokes being a geometric shape, encoding the start location of each stroke relative to a reference in the block, and encoding at least first and second dimensions of the strokes.

12. The method of claim 11, where said strokes are rectangles, said start points are encoded by first and second coordinates and said first dimension is the width and said second dimension is the height of the rectangle.

13. The method of claim 12, where said reference is a corner of said block.

14. A means for displaying reduced and expanded normalized characters in a photocomposition device comprising means for encoding a set of normalized characters in a series of overlapping strokes, each stroke being a geometric shape, and defined by the start point of each stroke relative to the character block and by a first and second dimension of each stroke, means for encoding a set of instructions describing the display placement and size of characters, means for determining the display locations coextensive with each stroke and storing said locations, and means for accessing said stored locations for display of said strokes and said characters.

* * * * *